US012580986B2

(12) United States Patent
Abid et al.

(10) Patent No.: US 12,580,986 B2
(45) Date of Patent: Mar. 17, 2026

(54) METHOD FOR MANAGING A COMMUNICATING METER

(71) Applicant: SAGEMCOM ENERGY & TELECOM SAS, Rueil Malmaison (FR)

(72) Inventors: Oussama Abid, Rueil Malmaison (FR); Abbas Sabraoui, Rueil Malmaison (FR); Ahmet Samet Basturk, Rueil Malmaison (FR)

(73) Assignee: SAGEMCOM ENERGY & TELECOM SAS, Bois-Colombes (FR)

( * ) Notice: Subject to any disclaimer, the term of this patent is extended or adjusted under 35 U.S.C. 154(b) by 279 days.

(21) Appl. No.: 18/208,714

(22) Filed: Jun. 12, 2023

(65) Prior Publication Data

US 2024/0007530 A1 Jan. 4, 2024

(30) Foreign Application Priority Data

Jun. 29, 2022 (FR) ...................................... 2206566

(51) Int. Cl.
*G08B 21/00* (2006.01)
*H04L 67/12* (2022.01)
*H04W 72/56* (2023.01)
(52) U.S. Cl.
CPC ............. *H04L 67/12* (2013.01); *H04W 72/56* (2023.01)
(58) Field of Classification Search
CPC ........ H04L 67/12; H04W 72/56; H04W 4/38; H04W 52/0261; G06F 1/3212;
(Continued)

(56) References Cited

U.S. PATENT DOCUMENTS 9,256,908 B2 * 2/2016 Dai ........................ G06Q 50/06
9,860,730 B2 * 1/2018 Mani ................... H04W 56/001
(Continued)

FOREIGN PATENT DOCUMENTS

DE 11 2017 004311 T5 5/2019
EP 3 264 225 A1 1/2018
(Continued)

OTHER PUBLICATIONS

Feb. 9, 2023 Search Report issued in French Patent Application No. 2206566.

*Primary Examiner* — Toan N Pham
(74) *Attorney, Agent, or Firm* — Williams Mullen; R. Brian Drozd

(57) ABSTRACT

A method for managing a communicating meter supplied by cell, for measuring consumption of a fluid, the meter including a measurement unit. The meter has three operating modes: a nominal operating mode wherein the measurement unit makes measurements at a predetermined nominal frequency, a degraded operating mode wherein the measurement unit makes measurements at a predetermined degraded frequency lower than the nominal, and a minimum operating mode wherein the measurement unit makes measurements at the predetermined degraded frequency, and a control unit of the meter performs the following steps: making an estimation of the remaining capacity of the meter battery; requesting that the meter passes from the nominal to the degraded operating mode when the estimation is below or equal to a first threshold; and requesting that the meter passes from the degraded to the minimum operating mode when the estimation is below or equal to a second threshold.

10 Claims, 2 Drawing Sheets

(58) Field of Classification Search
 CPC .............. H04Q 9/00; H04Q 2209/826; H04Q
 2209/84; H04Q 2209/88; G01R 31/387;
 G08B 21/18
 See application file for complete search history.

(56) References Cited

U.S. PATENT DOCUMENTS

| | | | | |
|---|---|---|---|---|
| 10,045,291 | B2 * | 8/2018 | Mani ................. | H04W 52/0209 |
| 10,154,460 | B1 | 12/2018 | Miller et al. | |
| 2001/0054967 | A1 | 12/2001 | Vanderah et al. | |
| 2003/0014198 | A1 | 1/2003 | Kramer et al. | |
| 2012/0047379 | A1 | 2/2012 | Chen et al. | |
| 2014/0077964 | A1 | 3/2014 | Beligere et al. | |

FOREIGN PATENT DOCUMENTS

| | | | |
|---|---|---|---|
| EP | 3 975 202 | A1 | 3/2022 |
| JP | 2004-230152 | A | 8/2004 |

* cited by examiner

METHOD FOR MANAGING A COMMUNICATING METER

TECHNICAL FIELD

The invention relates to the field of communicating meters supplied by cell and comprising a measurement unit and relates more particularly to the field of managing communicating meters supplied by cell to preserve the integrity of the measurements when the cell arrives at the end of its life.

PRIOR ART

As is known, the Internet of Things (IoT) is continually expanding. The Internet of Things represents the extension of the internet to things and to places in the physical world. Whereas the internet does not normally extend beyond the electronic world, the Internet of Things represents exchanges of information and data coming from devices present in the real world to the internet, such as for example for collecting water consumption readings or for the remote monitoring of environmental conditions (temperature, pressure, etc). The Internet of Things is considered to be the third evolution of the internet, termed Web 3.0. The Internet of Things has a universal character for designating connected objects with varied uses, for example in the field of e-health or home automation.

A first approach adopted for interconnecting objects, referred to as communicating objects ("IoT device"), in the context of the Internet of Things, relies on a deployment, controlled by an operator, of collecting gateways located on geographically high points. Apart from maintenance operations, these gateways are fixed and permanent. The SigFox (registered trade mark) or ThingPark (registered trade mark) networks can for example be cited with regard to this model. For example, in France, the SigFox (registered trade mark) network relies on high points of the TDF («Télédiffusion de France») transmission sites. These collecting gateways communicate with the communicating objects by means of medium- or long-range radio communication systems (e.g. the LoRa (registered trade mark) system of the company Semtech). This approach relies on a limited number of collecting gateways (difficulty in deploying new network infrastructures), as well as on a reliable and secure uplink access with one or more collecting servers.

A second approach consists of connecting communicating objects through residential gateways. Mention can for example be made of the Energy Gateway technology. A system according to the Energy Gateway technology is composed of two distinct parts: firstly a residential gateway and peripheral sensors, which are hosted at the consumer and which allow the collection of information, the transmission of this information to a collecting server, and control of the triggering of various actions (control of the triggering of radiators or of the water heater for example); secondly, the collecting server that provides the making available of the information received and the transmission of commands for controlling triggering of various actions. This collecting server is accessible via the internet. The radio technologies used for communicating with the communicating objects according to this second approach are of relatively short range (for example of the Zigbee (registered trade mark), Bluetooth (registered trade mark) or Wi-Fi (registered trade mark) type) for serving a local collection restricted to the objects in the dwelling.

Such communicating objects typically comprise one or more sensors, and are typically supplied by cells (or batteries). One difficulty lies in preserving the service life of the cells, and more particularly in guaranteeing the operation of the essential functionalities of such communicating objects throughout the service life of the cells.

It is desirable to overcome these drawbacks of the prior art. It is in particular desirable to provide a solution that makes it possible to ensure the integrity of the data stored and/or supplied by these communicating objects when their cells arrive at the end of their life, and this while minimising the extra hardware cost that such a solution would entail. It should be noted that extra hardware cost generally gives rise to a greater space requirement (for example, capacitive elements are more expensive and more bulky than transistors or resistors).

Thus it is desirable to provide a method for managing a communicating object making it possible to guarantee the supply of electrical energy to the communicating object during a predefined period.

The communicating objects are for example communicating meters and the invention makes it possible to extend the ability of the cells to provide electrical energy to the communicating meter throughout a predefined period while guaranteeing optimum measurements of fluid consumption (gas, water, etc).

DISCLOSURE OF THE INVENTION

For this purpose, according to a first aspect, a method is proposed for managing a communicating meter supplied by cell, for measuring consumption of a fluid, the meter comprising a measurement unit for acquiring measurements of consumption of the fluid.

The meter has three operating modes available:
a nominal operating mode in which the measurement unit makes measurements at a predetermined nominal frequency,
a degraded operating mode in which the measurement unit makes measurements at a predetermined degraded frequency lower than the nominal frequency, and
a minimum operating mode in which the measurement unit makes measurements at the predetermined degraded frequency. A control unit of the meter performs the following steps:
making an estimation of the remaining capacity of the cell of the meter;
requesting that the meter passes from the nominal operating mode to the degraded operating mode when said estimation is below or equal to a first threshold; and
requesting that the meter passes from the degraded operating mode to the minimum operating mode when said estimation is below or equal to a second threshold.

Particularly advantageously, the use of a degraded operating mode in which the measurement frequency is modified makes it possible to preserve the remaining capacity of the cell while guaranteeing an ability to measure the consumption of the fluid. Furthermore, the use of a degraded operating mode in which the measurement frequency is modified makes it possible to preserve the remaining capacity of the cell to guarantee the supply of electrical energy to the communicating object during a predefined period.

According to a particular provision, in nominal operating mode, the meter performs actions selected from: transmitting the collected measurements at a first predetermined periodicity, updating a program of the meter or of at least one functionality of the meter, enabling a communication via a wireless or optical communication member, transmitting a backup of the measurements at a second predetermined periodicity, sending an alarm signal for detection of an anomaly.

According to a particular provision, in degraded operating mode and in minimum operating mode, the meter obtains an associated priority level for each action selected, and the meter modifies or interrupts the action according to the associated priority level of the action.

According to a particular provision, in degraded operating mode, the meter transmits the collected measurements at a third predetermined periodicity.

According to a particular provision, in degraded operating mode, the meter updates solely a program of the measurement unit.

According to a particular provision, in degraded operating mode, the meter transmits a backup of the measurements at a fourth predetermined periodicity.

According to a particular provision, in degraded operating mode, the meter enables solely a communication via an optical communication member.

According to a particular provision, in degraded operating mode, the meter sends an alarm signal solely for the detection of a leakage of fluid.

According to a particular provision, the nominal frequency lies between 6 Hz and 10 Hz.

According to a particular provision, the degraded frequency lies between 1 Hz and 3 Hz.

According to another aspect, a computer program product is proposed, comprising program code instructions for executing the management method, when said instructions are executed by a processor.

According to another aspect, a non-transient storage medium is proposed, on which a computer program product is stored, comprising program code instructions for executing the management method, when said instructions are read from said non-transient storage medium and executed by a processor.

According to another aspect, a communicating meter supplied by cell is proposed, for measuring consumption of a fluid, the meter comprising a measurement unit for acquiring measurements of consumption of the fluid.

The meter has three operating modes available:

a nominal operating mode in which the measurement unit makes measurements at a predetermined nominal frequency, a degraded operating mode in which the measurement unit makes measurements at a predetermined degraded frequency lower than the nominal frequency, and a minimum operating mode in which the measurement unit makes measurements at the predetermined degraded frequency.

The control unit of the meter comprises electronic circuitry configured for:

making an estimation of the remaining capacity of the cell of the meter;

requesting that the meter passes from the nominal operating mode to the degraded operating mode when said estimation is below or equal to a first threshold; and requesting that the meter passes from the degraded operating mode to the minimum operating mode when said estimation is below or equal to a second threshold.

BRIEF DESCRIPTION OF THE DRAWINGS

The features of the invention mentioned above, as well as others, will emerge more clearly from the reading of the following description of at least one example embodiment, said description being made in relation to the accompanying drawings, among which.

DETAILED DISCLOSURE OF EMBODIMENTS

Communicating Meter Supplied by Cell

Figure 1:
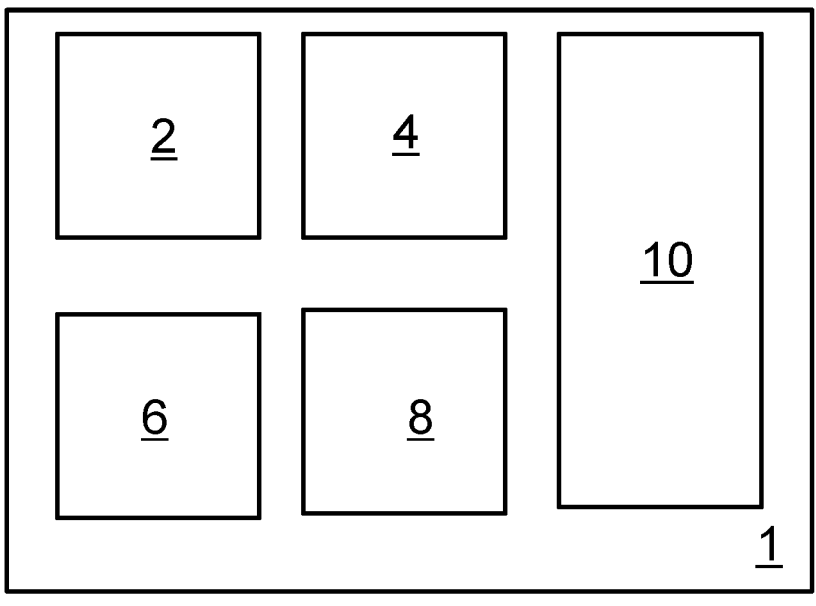
FIG. 1 illustrates schematically an example of hardware architecture of a communicating meter with cell.

With reference to FIG. 1, a communicating object supplied by a cell 2 is proposed. The term 'cell' is must be understood as being a single cell, or a set of cells providing conjointly an autonomous source of electrical energy.

The present invention is described in a particular embodiment where the communicating object is a fluid meter 1, i.e. adapted and configured to measure a consumption of a fluid (water, gas, etc). The present invention is also applicable to communicating objects such as sensors for temperature, pressure, humidity, etc.

The meter 1 comprises in particular a measurement unit 4 for acquiring measurements, a communication unit 6, a signalling unit 8 for sending alarm signals, and a control unit 10.

Typically, the measurement unit 4 can be adapted and configured to measure a consumption of water, or a consumption of another fluid such as gas. In this regard, the measurement unit 4 comprises known means for measuring (metrology) and monitoring a consumption of water.

The communication unit 6 comprises a set of communication members allowing the transmission of measurements acquired by the measurement unit 4, for example to a collecting gateway or to a residential gateway.

Typically, the communication unit 6 comprises members for communication via a telephone network, via the internet (protocols for communication on IP), via a LoRa (registered trade mark) system of the company Semtech, via a Wi-Fi system (registered trade mark), via a system of the Zigbee (registered trade mark) type, via a system of the Bluetooth (registered trade mark) type, via a low power wide area network system (LPWAN), or via a cellular network dedicated to the Internet of things of the NB-IOT type («Narrowband Internet Of Things»), or of the LTE Cat-M («Long Term Evolution—Category Machine») type.

As will be detailed below, the meter 1, through its communication unit 6, can favour certain communication channels according to the state of charge of the battery 2 and according to the nature of the data to be transmitted.

The signalling unit 8 comprises electronic circuitry for sending alarm signals. Typically, the signalling unit may comprise members allowing the sending of optical signals (for example light-emitting diodes). In addition, the signalling unit 8 can transmit alarm signals via the communication unit 6 to transmit the alarm signals to remote units via wireless systems as stated previously.

The control unit 10 comprises electronic circuitry for controlling and coordinating all the previously mentioned units (measurement unit 4, communication unit 6, signalling unit 8). Furthermore, the control unit 10 is adapted to implement a management method detailed below.

Figure 2:
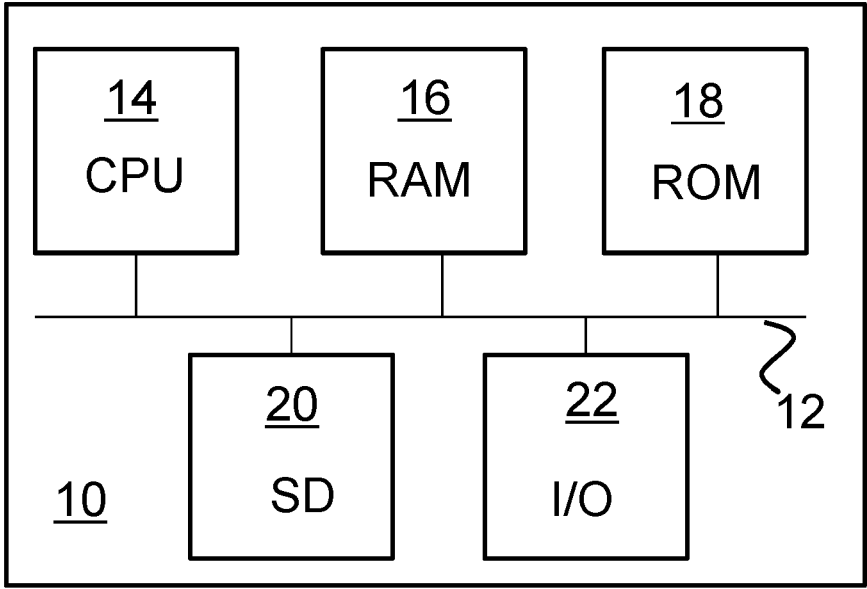
FIG. 2 illustrates schematically an example of hardware architecture of a control unit of a communicating meter.

FIG. 2 illustrates schematically an example of hardware architecture of the control unit 10. According to this example, the control unit 10 comprises, connected by a communication bus 12: a processor or CPU ("central processing unit") 14; a random access memory (RAM) 16; a read only memory (ROM) 18; a storage unit or a storage medium reader, such as an SD ("Secure Digital") card reader 20; a set of interfaces 22 enabling the control unit 10 to communicate with the other elements of the hardware architecture presented above in relation to FIG. 1.

The processor 14 is capable of executing instructions loaded in the RAM 16 from the ROM 18, from an external memory, from a storage medium, or optionally from a communication network. When the control unit 10 is powered up, the processor 14 is capable of reading instructions from the RAM 16 and executing them. These instructions form a computer program causing the implementation, by the processor 14, of all or part of the management method described hereinafter.

Thus all or part of the management method described hereinafter can be implemented in software form by executing a set of instructions by a programmable machine, such as a DSP ("digital signal processor"), or a microcontroller. All or part of the algorithms and steps described here can also be implemented in hardware form by a machine or a dedicated component, such as an FPGA ("field-programmable gate array"), or an ASIC ("application-specific integrated circuit").

Management Method

According to a second aspect, a method 100 is proposed for managing a communicating meter 1 supplied by cell, for measuring consumption of a fluid.

The management method 100 distinguishes three operating modes of the meter 1: a nominal operating mode, a degraded operating mode and a minimum operating mode.

These various modes will be detailed hereinafter.

In the case, for example, of a meter 1 having a service life of the order of 10 years to 20 years, the method 100 can be implemented according to a periodicity of one or several 35 weeks.

Figure 3:
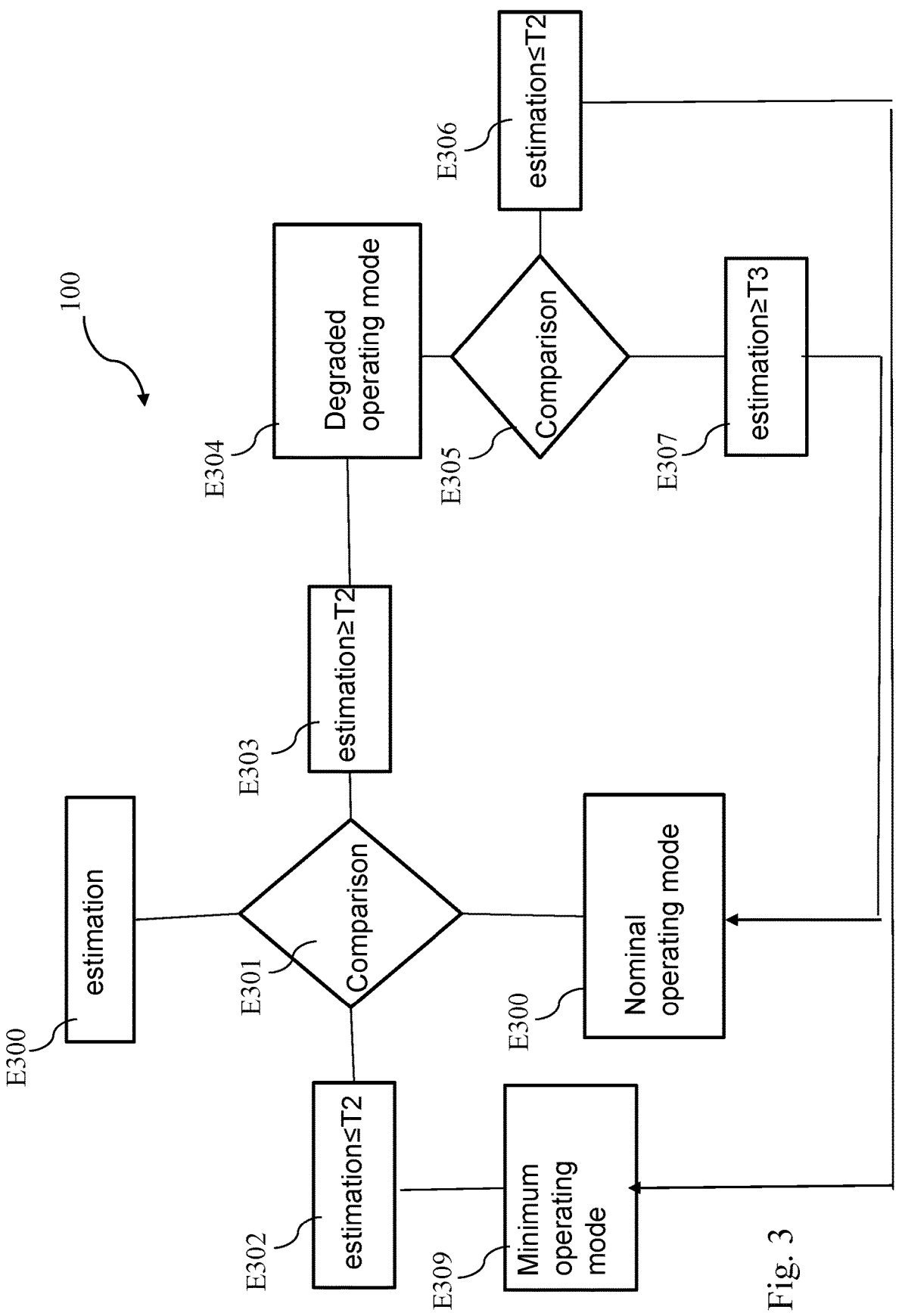
FIG. 3 is an algorithm of a method for managing a communicating meter supplied by cell(s)

The management method 100, as illustrated schematically on FIG. 3, makes it possible to control the activation and deactivation of these three modes. In other words, the management method 100 makes it possible to control the passage of the meter 1 from the nominal operating mode to the degraded operating mode, from the degraded operating mode to the minimum operating mode, from the degraded operating mode to the nominal operating mode, and from the minimum operating mode to the nominal operating mode.

Particularly cleverly, the passage from one mode to another is performed according to an estimation of the remaining capacity of the cell 2.

The remaining capacity of the cell is an estimation of the period during which the cell 2 will be able to supply energy to the meter. More precisely, the management method 100 comprises a step E300 in which the control unit makes an estimation of the remaining capacity of the cell 2 of the meter 1. Typically, the estimation of the remaining capacity of the cell 2 can be made by means of a coulomb meter using a table associating an energy consumed per unit of time with each operating mode of the meter 1 and by accumulating over time the energies consumed, or by making a measurement of the current circulating in the cell 2.

According to the estimation 108, the control unit 10 performs a step E301 of comparing the estimation with two thresholds T1 and T2. If the estimation is below or equal to a first threshold T1, the control unit passes to a step E303 and, at a step E304, requests that the meter 1 passes from the nominal operating mode to the degraded operating mode.

The threshold T1 is determined as proportional to a predefined period Tlife during which the meter 1 must be supplied with electrical energy from which the period of time Tserv since which the meter was brought into service is subtracted.

$$T1 = K1 * (Tlife - Tserv)$$

For example, the predefined period is 5 years and K1 is equal to 80%.

The threshold T2 is determined as proportional to a predefined period Tlife during which the meter 1 must be supplied with electrical energy from which the period of time Tserv since which the meter was brought into service is subtracted.

$$T1 = K2 * (Tlife - Tserv)$$

For example, the predefined period is 5 years and K2 is equal to 50%.

If the estimation is below or equal to a second threshold T2, then the control unit 10 passes to a step E302 and, at a step E309, requests that the meter 1 passes from the degraded operating mode to the minimum operating mode.

The second threshold T2 is lower than the first threshold T1.

As will be detailed below, the passage into nominal operating mode, into degraded operating mode or into minimum operating mode has an impact on the frequency of measurements and the actions performed by the meter 1.

Nominal Operating Mode

In nominal operating mode, the measurement unit 4 makes measurements at a predetermined nominal frequency, In a particular embodiment, the nominal frequency lies between 6 Hz and 10 Hz. Preferentially, the nominal frequency is 8 Hz.

In addition, in nominal operating mode, the meter 1 performs actions selected from: transmitting the collected measurements at a first predetermined periodicity, updating a programme of the meter 1 or of at least one functionality of the meter 1, enabling a communication via a wireless or optical communication member, transmitting a backup of the measurements at a second predetermined periodicity, sending an alarm signal for detection of an anomaly.

More precisely, the transmission of the collected measurements at a first predetermined periodicity can, for example, be implemented once a day. This transmission can be implemented by the transmission unit 6 to a server of a supplier of fluid (typically a supplier of drinking water in the case of a meter 1 for measuring consumption of water.

In nominal operating mode, the action of updating a program of the meter 1 can be performed at any time and can relate to all the programs for operating the meter 1. The updating can be implemented via the communication unit 6. Preferentially, the updates are implemented in accordance with a so-called FOTA ("Firmware Over The Air") method.

In nominal operating mode, the management method 100 allows the use of all the ports and technologies of the communication unit 6

In nominal operating mode, the management method 100 enables the meter 1, by means of the communication unit 6, to transmit a backup of the measurements at a second predetermined periodicity. Preferentially, the backup of the measurements is transmitted once a day. Typically, the backups can be transmitted to a server controlled by a supplier of fluid (typically a supplier of drinking water in the case of a meter 1 for measuring consumption of water).

In nominal operating mode, the management method makes it possible to send an alarm signal for detection of an anomaly. In nominal operating mode, the alarm signal for detection of an anomaly may relate to the detection of a leakage of fluid, or a detection of a fraud, or, for example, a detection of fluid flowing in reverse direction.

Furthermore, in nominal operating mode, the management method 100 enables the transmission, at a fourth predetermined periodicity, of frames of supervisions comprising data relating to the pressure of the fluid, to the presence of the fluid or to the temperature of the fluid.

Order of Priority

Particularly cleverly, the management method 100 associates a priority level with each action that can be performed by the meter 1, which defines an order of priority in the actions that can be performed by the meter 1. The order of priority makes it possible to successively modify or interrupt the actions, according to the estimation of the remaining capacity of the cell 2.

Thus, according to one embodiment, the actions can be prioritised as follows (from the least priority to the most priority): transmitting a backup of the measurements at a second predetermined periodicity, enabling communication via a wireless or optical communication member, sending an alarm signal for detection of fluid flowing in reverse direction or for detection of the presence of fluid, transmitting monitoring frames, updating a program of the meter 1 or of at least one functionality of the meter 1, transmitting collected measurements at the first predetermined periodicity, sending an alarm signal for detection of a leakage of fluid or of a fraud.

Measurement of the consumption of the fluid has the highest order of priority.

Degraded Operating Mode

As indicated previously, when the estimation of remaining capacity of the cell 2 is below or equal to the first threshold T1, then the management method 100 triggers the passage of the meter 1 into degraded operating mode.

In degraded operating mode, the actions listed previously are modified or interrupted, preferentially according to the priority level thereof Thus, as shown schematically in FIG. 3, if the meter 1 is in nominal operating mode and the estimation of the capacity is below or equal to the first threshold T1, then the meter 1 will pass into degraded operating mode. At this first passage into degraded operating mode, the meter 1 will modify the action consisting of transmitting a backup of the measurements at the second predetermined periodicity. In degraded operating mode, this action is performed at the fourth predetermined periodicity. Preferentially, the fourth predetermined periodicity is once a week.

Thus, in passing into degraded operating mode, the meter 1 will transmit a backup of the measurements (of fluid consumption) at the fourth predetermined periodicity.

This change in periodicity of transmission of backup of the measurements tends to reduce the consumption of the cell 2. The estimation of the remaining capacity of the cell 2 is recalculated and recompared at the (comparison) step E305 with the thresholds T1 and T2. If this estimation remains below or equal to the first threshold T1, then the following action in the prioritisation list is modified or interrupted. Preferentially, the local wireless transmissions are suspended. This modification or interruption tends to reduce the consumption of the cell 2. The estimation of the remaining capacity of the cell 2 is recalculated and recompared (comparison) with the thresholds T1 and T2. If this estimation remains below or equal to the first threshold T1, then the following action in the prioritisation list is modified or interrupted. Preferentially, the sendings of alarm for detection of fluid flowing in reverse direction are suspended, and only the sendings of alarm for detection of presence of fluid are maintained. This modification or interruption tends to reduce the consumption of the cell 2. The estimation of the remaining capacity of the cell 2 is recalculated and recompared at the step E305 with the thresholds T1 and T2. If this estimation remains below or equal to the first threshold, then the following action in the prioritisation list is modified or interrupted. Preferentially, the action of transmitting monitoring frames is interrupted. This modification or interruption tends to reduce the consumption of the cell 2. The estimation of the remaining capacity of the cell 2 is recalculated and recompared (comparison) with the thresholds T1 and T2. If this estimation remains below or equal to the first threshold T1, then the following action in the prioritisation list is modified or interrupted. Preferentially, the updating of a program of the meter 1 or of at least one functionality of the meter 1 is modified so that only the updates of the measurement unit 4 are implemented (thus the updates of the communication unit 6, the updates of various application software and the updates of various monitoring software are temporarily suspended). This modification or interruption tends to reduce the consumption of the cell 2. The estimation of the remaining capacity of the cell 2 is recalculated and recompared (comparison) with the thresholds T1 and T2. If this estimation remains below or equal to the first threshold T1, then the following action in the prioritisation list is modified or interrupted. Preferentially, the transmission of the collected measurements at a first predetermined periodicity is modified. In degraded operating mode, the measurements are transmitted at a third predetermined periodicity. Preferentially, the third periodicity corresponds to two transmissions per month. This modification or interruption tends to reduce the consumption of the cell 2. The estimation of the remaining capacity of the cell 2 is recalculated and recompared (comparison) with the thresholds T1 and T2. If this estimation remains below or equal to the first threshold T1, then the following action in the prioritisation list is modified or interrupted. Preferentially, the sending of an alarm signal for detection of a leakage or of a fraud is modified. Preferentially, in degraded operating mode, the meter 1 no longer sends an alarm signal for detection of a fraud. This modification or interruption tends to reduce the consumption of the cell 2. The estimation of the remaining capacity of the cell 2 is recalculated and recompared (comparison) with the thresholds T1 and T2. If this estimation remains below or equal to the first threshold T1, then the following action in the prioritisation list is modified or interrupted. Preferentially, the frequency of measurements of the fluid consumption is modified. In degraded operating mode, the meter 1 makes measurements at a degraded frequency. In a particular embodiment, the degraded frequency lies between 1 Hz and 3 Hz. Preferentially, the degraded frequency is 2 Hz.

Particularly advantageously, the use of a degraded operating mode in which the actions are prioritised and in which the measurement frequency is modified makes it possible to preserve the remaining capacity of the cell 2 while guaranteeing an ability to measure the consumption of the fluid.

In a particular embodiment, if the estimation of the remaining capacity of the cell becomes higher than a third predetermined threshold T3, then the management method passes to the step E307 and makes the meter pass from the degraded operating mode to the nominal operating mode at the step E308. Typically, if, in the environment in which the meter 1 is installed, the radio transmission conditions improve, then the communication unit 6 will consume less energy and the estimation of the remaining capacity of the cell 2 will be able to increase. The third threshold T3 corresponds to a hysteresis making it possible to ensure that the estimation of the remaining capacity of the cell 2 has increased sufficiently to pass from the degraded operating mode to the nominal operating mode (so as to avoid a phenomenon of rapid oscillation between the nominal operating mode and the degraded operating mode).

For example, the threshold T3 is determined as proportional to a predefined period Tlife during which the meter 1 must be supplied with electrical energy from which the period of time Tserv since which the meter was brought into service is subtracted.

$$T3=K3*(Tlife-Tserv) \text{ with } K3=0.95 \text{ or } 1.$$

On the other hand, if the estimation of the remaining capacity of the cell 2 continues to decrease and becomes less than a second threshold T2, then the management method passes to the step E306 and makes the meter 1 pass into stop mode at the step E309.

Minimum Operating Mode

In minimum operating mode, only the measurements of the fluid consumption are made. The measurement of the fluid consumption is made at the degraded frequency. The other actions that can be performed by the meter 1 are interrupted.

The invention claimed is:

1. A method for managing a communicating meter supplied by cell, for measuring consumption of a fluid, the meter comprising a measurement unit for acquiring measurements of consumption of the fluid,
   wherein the meter has three operating modes available:
   a nominal operating mode in which the measurement unit makes measurements at a predetermined nominal frequency, in nominal operating mode the meter performs actions selected from: transmitting the collected measurements at a first predetermined periodicity, updating a program of the meter or of at least one functionality of the meter, enabling a communication via a wireless or optical communication member, transmitting a backup of the measurements at a second predetermined periodicity, sending an alarm signal for detection of an anomaly;
   a degraded operating mode in which the measurement unit makes measurements at a predetermined degraded frequency lower than the nominal frequency, and
   a minimum operating mode in which the measurement unit makes measurements at a predetermined degraded frequency,
   wherein a control unit of the meter performs the following steps:
   making an estimation of a remaining capacity of the cell of the meter;
   requesting that the meter passes from the nominal operating mode to the degraded operating mode when the estimation is below or equal to a first threshold; and
   requesting that the meter passes from the degraded operating mode to the minimum operating mode when the estimation is below or equal to a second threshold, and
   wherein, in degraded operating mode and in minimum operating mode, the meter obtains an associated priority level for each action selected, and the meter modifies or interrupts the action according to the associated priority level of the action.

2. The method according to claim 1, wherein, in degraded operating mode, the meter transmits the collected measurements at a third predetermined periodicity.

3. The method according to claim 1, wherein, in degraded operating mode, the meter updates solely a program of the measurement unit.

4. The method according to claim 1, wherein, in degraded operating mode, the meter transmits a backup of the measurements at a fourth predetermined periodicity.

5. The method according to claim 1, wherein, in degraded operating mode, the meter enables solely a communication via an optical communication member.

6. The method according to claim 1, wherein, in degraded operating mode, the meter sends an alarm signal only for detection of a leak of fluid.

7. The method according to claim 1, wherein the nominal frequency lies between 6 Hz and 10 Hz.

8. The method according to claim 1, wherein the degraded frequency lies between 1 Hz and 3 Hz.

9. A non-transient storage medium on which a computer program product is stored, comprising program code instructions for executing the management method according to claim 1, when the instructions are read from the non-transient storage medium and executed by a processor.

10. A communicating meter supplied by a cell, for measuring consumption of a fluid, the meter comprising a measurement unit for acquiring measurements of consumption of the fluid, wherein the meter has three operating modes available:
   a nominal operating mode in which the measurement unit makes measurements at a predetermined nominal frequency, in nominal operating mode the meter performs actions selected from: transmitting the collected measurements at a first predetermined periodicity, updating a program of the meter or of at least one functionality of the meter, enabling a communication via a wireless or optical communication member, transmitting a backup of the measurements at a second predetermined periodicity, sending an alarm signal for detection of an anomaly;
   a degraded operating mode in which the measurement unit makes measurements at a predetermined degraded frequency lower than the nominal frequency, and
   a minimum operating mode in which the measurement unit makes measurements at a predetermined degraded frequency, wherein a control unit of the meter comprises electronic circuitry configured for:
   making an estimation of a remaining capacity of the cell of the meter;
   requesting that the meter passes from the nominal operating mode to the degraded operating mode when the estimation is below or equal to a first threshold; and
   requesting that the meter passes from the degraded operating mode to the minimum operating mode when said estimation is below or equal to a second threshold, and
   wherein, in degraded operating mode and in minimum operating mode, the meter obtains an associated priority level for each action selected, and the meter modifies or interrupts the action according to the priority level associated with the action.

* * * * *